(12) United States Patent
Knobloch

(10) Patent No.: US 9,527,534 B2
(45) Date of Patent: Dec. 27, 2016

(54) SYSTEMS AND METHODS FOR REDUCING AERODYNAMIC DRAG ON CARGO TRUCKS

(71) Applicant: John Knobloch, Morton, IL (US)

(72) Inventor: John Knobloch, Morton, IL (US)

(*) Notice: Subject to any disclaimer, the term of this patent is extended or adjusted under 35 U.S.C. 154(b) by 0 days.

(21) Appl. No.: 14/602,659

(22) Filed: Jan. 22, 2015

(65) Prior Publication Data
US 2016/0214661 A1 Jul. 28, 2016

(51) Int. Cl.
B62D 35/00 (2006.01)

(52) U.S. Cl.
CPC .................. B62D 35/004 (2013.01)

(58) Field of Classification Search
CPC .................................... B62D 35/001
USPC ........................................ 296/180.4
See application file for complete search history.

(56) References Cited

U.S. PATENT DOCUMENTS

| | | | |
|---|---|---|---|
| 5,171,057 A * | 12/1992 | Sharp .................. | B62D 35/001 296/180.4 |
| 6,595,578 B1 | 7/2003 | Calsoyds | |
| 7,850,224 B2 | 12/2010 | Breidenbach | |
| 8,100,461 B2 | 1/2012 | Smith | |
| 8,196,996 B1 * | 6/2012 | Campbell ............ | B62D 35/001 296/180.1 |
| 8,240,711 B1 | 8/2012 | Horrell | |
| 8,272,680 B2 | 9/2012 | Breidenbach | |
| 8,360,509 B2 | 1/2013 | Smith | |
| 8,360,510 B2 | 1/2013 | Smith | |
| 8,480,162 B2 | 7/2013 | Breidenbach | |
| 8,708,399 B2 | 4/2014 | Smith | |
| 8,801,076 B2 * | 8/2014 | White, Sr. ............ | B62D 35/001 296/180.1 |
| 8,876,191 B2 | 11/2014 | Breidenbach | |
| 2013/0238198 A1 * | 9/2013 | Prentice ................. | B62D 35/02 701/49 |
| 2015/0225025 A1 * | 8/2015 | Habershon ........... | B62D 35/001 296/180.1 |

OTHER PUBLICATIONS

Nathan Pandian; "Drag Reduction: The Pursuit of Better Fuel Economy"; illumin, A review of engineering in everyday life; vol. XV Issues III (Jan. 21, 2015).
Fred Browand; "Reducing Aerodynamic Drag and Fuel Consumptio;" PowerPoint Presentation for Global Climate and Energy Project; Oct. 10-11, 2002; Stanford University.

* cited by examiner

Primary Examiner — Pinel Romain

(57) ABSTRACT

An aerodynamic drag system is provided. The aerodynamic drag system is configured to reduce air drag on a cargo truck. The aerodynamic drag system includes an air capture system, an air channel system, and an air distribution system. The air capture system is configured to capture air at a front location of a cargo truck. The air channel system is coupled with the air capture system and is configured to guide the captured air from the front location of a cargo truck to a rear location of the cargo truck. The air distribution system is coupled with the air channel system and configured to distribute the captured air at the rear of the cargo truck such that the differential pressure on the cargo truck when moving is reduced.

2 Claims, 10 Drawing Sheets

SYSTEMS AND METHODS FOR REDUCING AERODYNAMIC DRAG ON CARGO TRUCKS

BACKGROUND

The present embodiments relate to systems and methods that reduce aerodynamic drag on cargo trucks.

There is a desire to reduce aerodynamic drag on cargo trucks. Reducing aerodynamic drag of a cargo truck may reduce the consumption of fuel, which makes it less expensive to transport cargo. Cargo trucks consume fuel during operation. Even a relatively small reduction in aerodynamic drag on cargo trucks may amount to significant savings in fuel over time. For example, a cargo truck that travels 125,000 miles/year and consumes fuel at a rate of 5 miles/gallon may save hundreds or thousands of dollars per year with even a 2-3% reduction in aerodynamic drag. This may reduce the impact on the environment. There are other reasons that reducing aerodynamic drag on cargo trucks is desirable.

Conventionally, the most fuel efficient and successful trucking fleets minimize the gap between the truck and trailer, install skirts to prevent air from hitting their rear axles of the trailer, and install technology to streamline airflow at the rear of the vehicle. One attempt to streamline airflow at the rear of the vehicle is described in U.S. Pat. No. 6,595,578, "TRUCK AFTER-BODY DRAG REDUCTION DEVICE," which issued on Jul. 22, 2003. While the multi-flap approach described in that patent reduces after-body drag, there are still needs to reduce drag on a cargo truck.

DESCRIPTION

The present embodiments relate to reducing aerodynamic drag on a cargo truck.

In some embodiments, a system is configured to reduce the air pressure on the front of a cargo truck and/or increase the air pressure on the rear of the cargo truck. For example, in some embodiments, a system captures air at the front of a trailer and releases the air at the rear of the trailer to reduce the differential pressure on a cargo truck. In general, differential pressure is the difference between the pressure on the front of the cargo truck and the pressure on the rear of the cargo truck. For example, the wind resistance on the front of a truck creates considerable aerodynamic drag on the front of the truck. As the air is forced around the truck and it passes the end of the truck and a relative vacuum is created on the rear of the truck. For example, if the pressure at the front of the cargo truck is 0.2 pound per square inch (psi) and the pressure on the rear of the truck is 0.1 psi, then there is a differential of 0.3 psi created by the air flow past the truck. In some embodiments, a system is provided that reduces this differential pressure.

In some embodiments, a system is provided that may reduce drag both at the front of the cargo truck (e.g., between cab and trailer) and also at the rear of the cargo truck. Air may be captured at the front of the cargo truck, guided to the rear via an air channel system that traverses the length of the trailer, and then dispersed through an air distribution system that is configured to reduce the vacuum at the rear of the trailer. In particular, the air is guided into the air distribution system (e.g., cavity) and then out through distribution openings in the air distribution system. This reduces the drag coming over the rear of the trailer.

In some embodiments, an aerodynamic drag system manages distribution of the air using distribution openings that are located in a pattern that reduces the vacuum at the rear of the trailer. This type of air distribution is managed distribution of air to reduce drag.

Cargo Truck System 100

Figure 1:
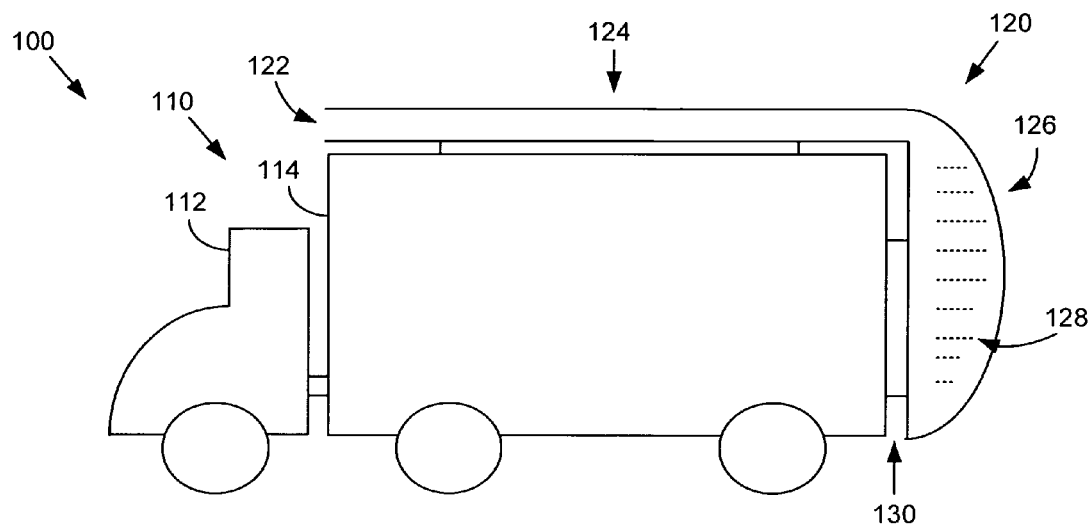
FIG. 1 illustrates an exemplary embodiment of an aerodynamic drag system.

FIG. 1 illustrates a cargo truck system 100. The cargo truck system 100 may include a cargo truck 110 and an aerodynamic drag system 120. The aerodynamic drag system 120 may be coupled with the cargo truck 110. "Coupled with" may include a mechanical connection, such as metal brackets, welding, screws, or other systems and devices that connect the aerodynamic drag system to the cargo truck.

The cargo truck system 100 may include additional, different, or fewer components or systems. For example, the cargo truck system 100 may include additional systems that reduce aerodynamic drag, such as side skirts.

Cargo Truck 110

The cargo truck 110 may include a cab 112 and a trailer 114. The cargo truck 110 may be used to transport cargo from one location to another, store cargo, or otherwise operate as a cargo truck. However, the cargo truck 100 does not need to carry cargo. It may be empty. The cargo truck 110 may be referred to as a tractor-trailer, big rig, prime mover, transport, or articulated lorry, for example.

The cargo truck 110 may include additional, different, or fewer components or systems. For example, the cargo truck 110 may include a single cab and multiple trailers linked together. In another example, the cargo truck 110 may include other vehicular components, such as wheels, axels, steering wheels, that allow the cargo truck to operate. These vehicular components may be the same or different across different cargo trucks.

Cab 112

The cab 112 is a vehicle with an engine that is configured to transport the trailer 114. For example, the cab 112 may include a motor, cock-pit with control systems (e.g., steering wheel, etc.), one or more axles, and other components that allow the cab 112 to transport the trailer 114. Transporting the trailer 114 may include pulling or towing the trailer 114. In some embodiments, the cab 112, which may be referred to as a truck or tractor. For example, cabs designed to haul heavy-duty cargo may have as many as four or five axles, some often being lift axles.

Trailer 114

The trailer 114 may be a container that may be attached to the cab 112. The container may be configured to store, transport, house, or otherwise enclose cargo. For example, the container may be a configured as an enclosed box or rectangle that cargo may be loaded into. The container may include doors at the rear or on the side that allow the cargo to be loaded into or removed. In another example, the container may be refrigerated, such that perishable cargo (e.g., milk or meat) may be transported. In yet another example, the container may be configured to transport highly flammable cargo (e.g., gasoline or oil).

A trailer's dimensions may be the same or different than other trailers. For example, the length (e.g., front to rear) of the trailer may be 5 feet-53 feet. In some embodiments, the length is 28.5 feet. The width (e.g., side to side) may be 3 feet to 10 feet. Generally, the width is limited to 8.5 feet but in some cases it is wider. The height (e.g., bottom to top) may be 3 feet to 30 feet.

A trailer's shape may be the same or different than other trailers. For example, in some embodiments, the trailer may be shaped as a rectangle (e.g., designed to transport boxes) or oval (e.g., designed to transport liquid). Other shapes may be used.

A trailer may have a tandem axle pair at the rear, each of which has dual wheels, or eight wheels on the trailer, four per axle. The combination of eight tires on the trailer and ten tires on the cab is what led to the moniker "eighteen wheeler," although this term is considered by some truckers to be a misnomer. Many trailers are equipped with movable tandem axles to allow adjusting the weight distribution.

In some embodiments, the trailer 114 may be detachable from the cab 112. For example, in some embodiments, the trailer may be disconnected from a first cab and connected to a second cab, where the second cab is different from the first cab. Whereas, in other embodiments, the trailer may be fixed (e.g., welded, screwed, or otherwise fastened) to the cab. The cab and trailer may be merged together or separate units.

The connection between the cab 112 and trailer 114 may be rigid or movable. A rigid connection may include a connection that does not allow the trailer to rotate relative to the cab (e.g., a 10' moving truck from U-Haul© or a bus). Whereas, a movable connection allows the trailer to rotate relative to the cab (e.g., a semi-trailer that rotates on a pin).

There are various configurations of the cab 112 and trailer 114. For example, in some embodiments, a trailer 114 does not trail completely behind the cab 112, but is attached at a point that is just forward of the rear-most axle of the towing unit. This is done so that a large portion of the weight of the trailer is carried by the cab 112. This arrangement means that both cab 112 and trailer 114 will have a distinctly different design than a rigid cab 112 and trailer 114 (e.g., the connection between the cab 112 and trailer 114 does not pivot). In another example, the cab and trailer layout has a forward engine, one steering axle, and two drive axles. In some embodiments, there may be a "fifth-wheel" trailer coupling that is movable fore and aft, to allow adjustment in the weight distribution over its rear axle(s).

Aerodynamic Drag System 120

The aerodynamic drag system 120 may include an air capture system 122, air channel system 124, and an air distribution system 126. The air capture system 122 may be coupled with the air channel system 124 near the front (e.g., closest to the cab) of the cargo truck 110. The air channel system 124 may be coupled with the air channel distribution system 126 near the rear (e.g., furthest side from the cab) of the cargo truck 110. "Coupled with" may include a rigid (e.g., welding or manufactured as a single piece) or flexible (e.g., allows movement between) connection. "Coupled with" may include an airtight connection or non-airtight connection. The aerodynamic drag system 120 may include additional, different, or fewer components or systems.

The aerodynamic drag system 120 may reduce the differential pressure of the truck. On a cargo truck that is used to haul items from one place to another, the wind resistance on the front of a truck is considerable drag. Power (e.g., from the engine) is used to push the truck through the air. As a result, air is forced around the truck. As the air passes the end of the truck, a relative vacuum is created on the rear of the truck. For example, at rest (e.g., the cargo truck not moving), the pressure at the front would be the same as the pressure at the rear of the truck—namely, it would be atmospheric pressure. However, once the cargo truck starts moving the pressure at the front to the truck is increased 0.2 psi (pound per square inch) because of needing to force the air around the truck and the pressure on the rear of the truck is reduced by 0.1 psi because of the vacuum created. As a result, a differential of 0.3 psi is created by the air flow past the truck.

In some embodiments, the aerodynamic drag system 120 both reduces the air pressure at the front of the cargo truck 110 (e.g., front of the cab 112 or front of the trailer 114 or both) and increases the air pressure at the rear of the cargo truck 110 (e.g., rear of the trailer 114). In other embodiments, the aerodynamic drag system 120 only increases the air pressure at the rear of the cargo truck 110 (e.g., rear of the trailer 114). In other embodiments, the aerodynamic drag system 120 only reduces the air pressure at the front of the cargo truck 110.

The air capture system 122 is configured to capture, funnel, or otherwise guide air into the air channel system 124 and/or air distribution system 126. In some embodiments, the air capture system 122 is an input to the air channel system 124. For example, in some embodiments, the air capture system 122 allows air to flow into the air channel system 124. As shown in FIG. 1, the air capture system 122 is an opening that allows air to flow into the air channel system 124. In some embodiments the air capture system 122 may be 1 inch to 2 feet tall and/or 6 inches-multiple feet wide (e.g., as wide as the trailer or cab).

Figure 2:
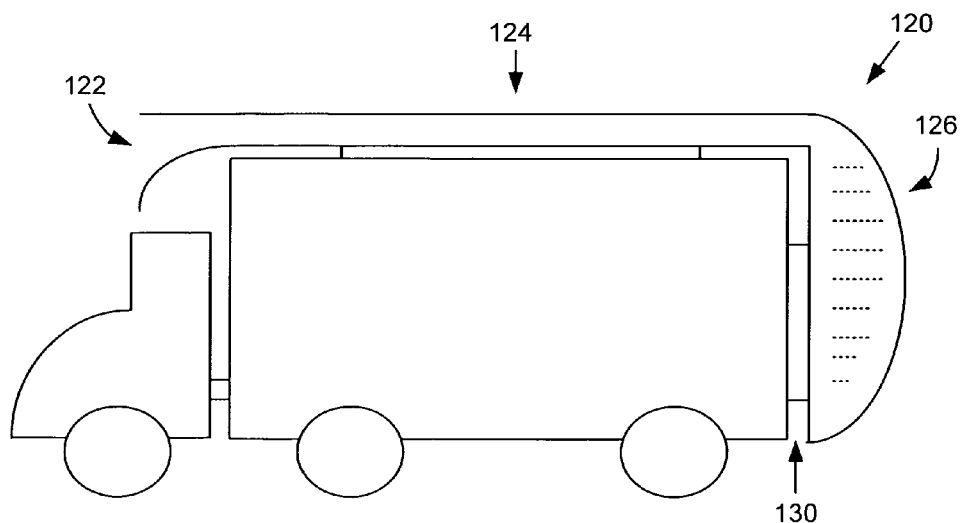
FIG. 2 illustrates another exemplary embodiment of an aerodynamic drag system.

In some embodiments, as shown in FIG. 1, the opening may be the same size as the air channel system. However, in other embodiments, as shown in FIG. 2, the air capture system 122 includes an opening that is larger (e.g., taller or wider) than the air channel system 124 such that more air is captured and guided into the air capture system 122. This may increase the pressure in the air channel system 124 relative to the embodiment shown in FIG. 1. The dimensions of the air capture system 122 may be configured to increase or decrease the pressure coming out of the air channel system 124, such that the pressure entering the air distribution system 126 is at a desired level. For example, the more air that is forced into the air channel system 124 may increase the pressure at which the air comes out of the air channel system 124.

In some embodiments, the size of the opening in the air capture system 122 may be adjusted. Adjustment may be performed based on, for example, the speed of the cargo truck, size of the load, road resistance, etc. Adjustment may be performed automatically using a computer and a motor, for example. The computer and motor may automatically adjust the size of the opening as the cargo truck progresses through its journey.

In some embodiments, the air capture system 122 may include a mesh, screen or other blocking device that prevents debris (e.g., insects, rocks, sticks, etc.) from entering the air channel system 124. The mesh, screen or other blocking device may be placed over the opening in the air capture system 122. In some embodiments, the mesh, screen, or other blocking device may be sized such that the openings in the screen are small enough that air is able to pass through but will prevent objects that may get lodged in the aerodynamic drag system to be blocked. For example, the size of a mesh may be 1 mesh-100 mesh (a number 4 mesh will have 4 openings per square inch, and 16 means it will have 16 openings per square inch).

Returning to FIG. 1, the air channel system 124 may be a system that guides air from one location or point to another location or point. For example, the air channel system 124 may guide air from the front of the trailer to the rear of the trailer, from the air capture system to the air distribution system, and/or from the front of the air channel system to the rear of the air channel system. The air channel system 124 may be an enclosed passage (e.g., circular, oval, square or rectangular) through which air may pass. In some embodiments, all or some of the air channel system 124 does not need to be enclosed. Rather, the air channel system 124 may direct or guide the air from a first location or point to a second location or point.

As shown in FIG. 1, the air channel system 124 is attached to the top of the trailer 114 and guides air from the front of the trailer (e.g., the portion of the trailer nearest to the cab) to the rear of the trailer (e.g., the portion furthest from the cab) and into the air distribution system 126.

Figure 3:
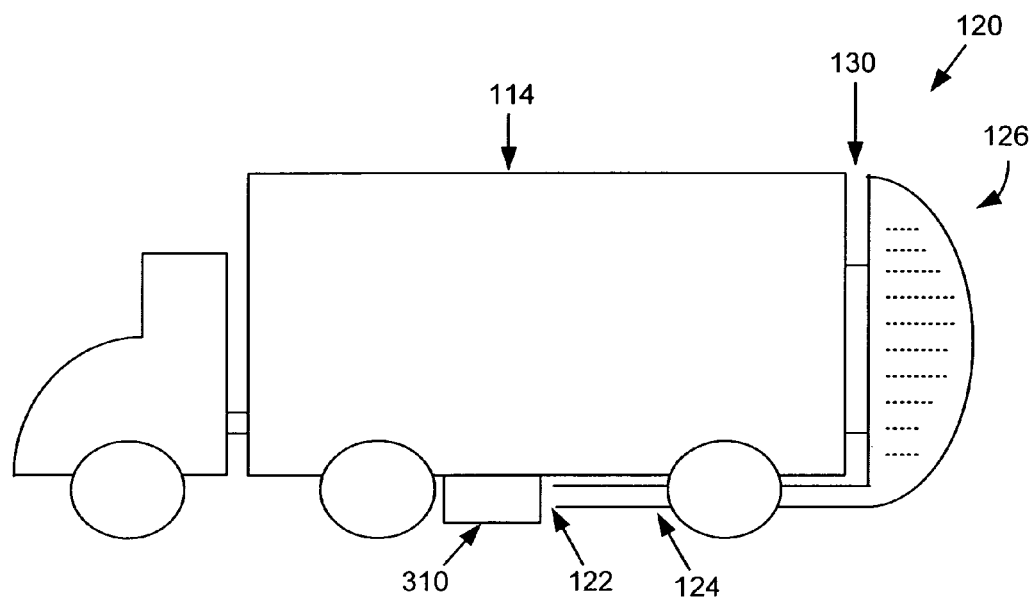
FIG. 3 illustrates another exemplary embodiment of an aerodynamic drag system.

In some embodiments, as shown in FIG. 3, the air capture system 122 and air channel system 124 may be located beneath (e.g., closest to the ground or road) the trailer 114. For example, as shown in FIG. 3, a trailer skirt 310 located on the bottom of the trailer 114 may guide air into the air capture system 122 and into the air channel system 124. The air capture system 122 may be located in front of the rear axle to further reduce the air hitting the rear axle relative to a cargo truck that only has the trailer skirt 310 and does not include the aerodynamic drag system 120. The air channel system 124 may run along the bottom of the trailer and connect to the air distribution system 126 at the rear, bottom of the trailer 114.

Figure 4:
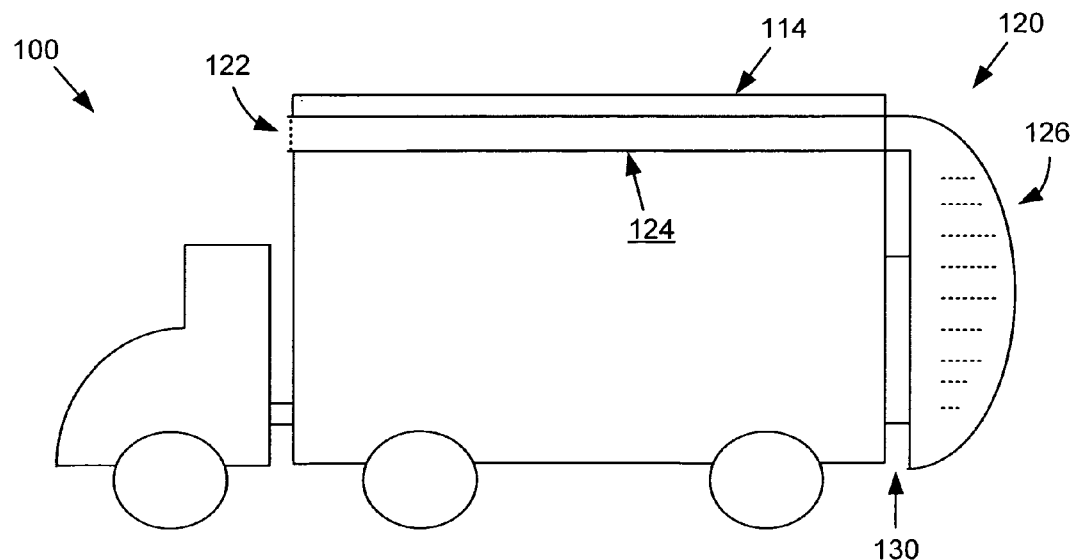
FIG. 4 illustrates another exemplary embodiment of an aerodynamic drag system.

In some embodiments, all or some of the air channel system 124 may be located inside the trailer. As shown in FIG. 4, the air capture system 122 (shown in FIG. 4 with a screen or mesh as a dotted line) may input air into the air channel system 124 that runs along the top (e.g., side furthest from the ground or road), inside of the trailer 114. In some embodiments, the air channel system 124 may be manufactured as part of the trailer.

Figure 5:
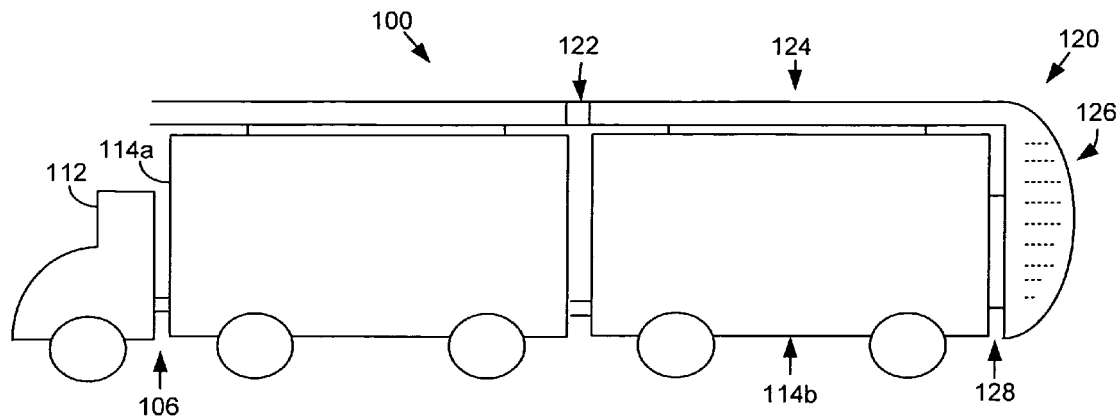
FIG. 5 illustrates another exemplary embodiment of an aerodynamic drag system.

FIG. 5 illustrates an air channel system 124 that spans two trailers 114a and 114b. Again, the air channel system 124 is configured to guide air from the front of the trailers (e.g., front of trailer 114a in this example) to the rear of the trailers (e.g., rear of trailer 114b in this example). Because the trailers need the ability to turn, there may be a flexible guide 122 at the point where the trailers are connected and are able to pivot. The flexible guide may be an accordion guide, brush guard, plastic, or other guide that is able to guide air when the truck is traveling straight but allows the air channel to rotate with the trailers.

Figure 6:
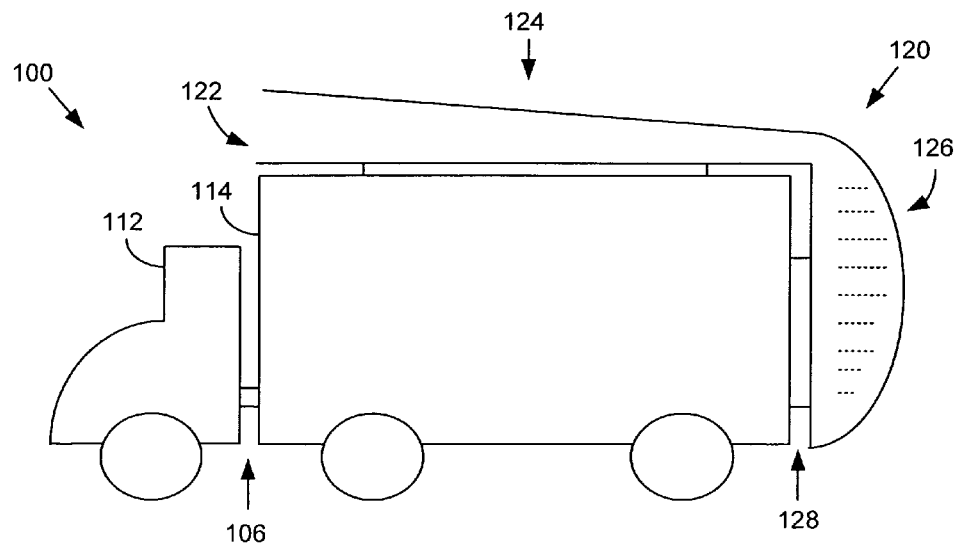
FIG. 6 illustrates another exemplary embodiment of an aerodynamic drag system.

FIG. 6 illustrates an embodiment where the height of the air channel system 124 is not the same for the entire length of the trailer. The height of the air channel system 124 is greater at the front of the trailer 114 than the rear of the trailer 114.

Returning to FIG. 1, the air distribution system 126 may be configured to receive air from the air channel system 124. The air may be guided into the air distribution system 126. The air distribution system 126 may include distribution holes, slots, or openings that allow the air to be released out of the air distribution system 126 and to the rear of the truck.

The air distribution system 126 may have a curved face. The curved face may help further reduce air drag at the rear. For example, air coming over the top of the trailer or air channel system may be forced around the curved face as opposed to dropping straight off and creating a vacuum at the rear of the truck.

Figure 7:
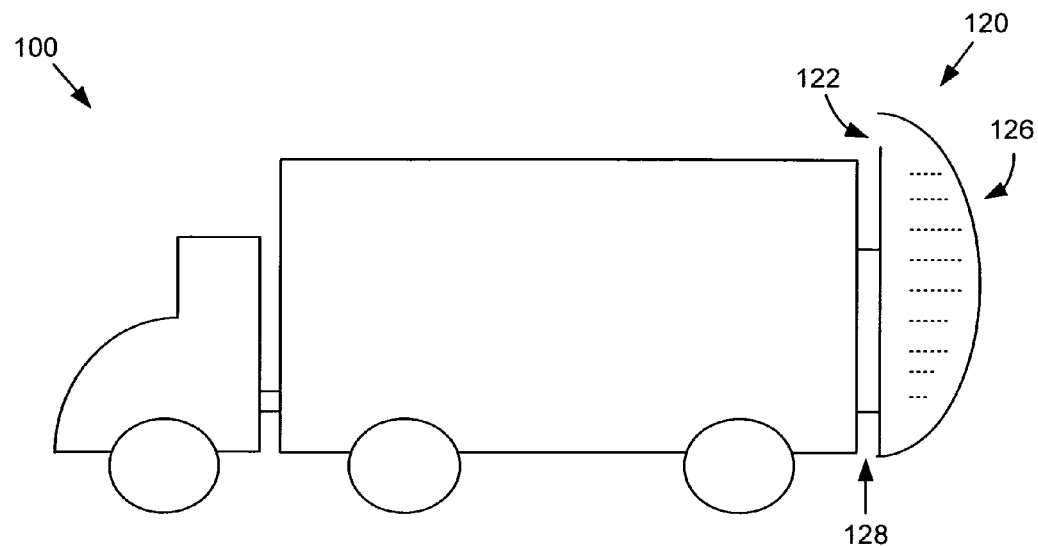
FIG. 7 illustrates another exemplary embodiment of an aerodynamic drag system.

As mentioned above, the aerodynamic drag system 120 may include additional, different, or fewer components or systems. FIG. 7 illustrates an embodiment with fewer components than shown in FIG. 1. For example, as shown in FIG. 7, the aerodynamic drag system 120 does not include an air capture system or an air channel system. Instead, the air distribution system 126 receives air and distributes that air without the other components. This may be preferable in some embodiments. However, it does not have the advantage of capturing air at the front of the trailer and distributing the air at the rear.

Figure 8:
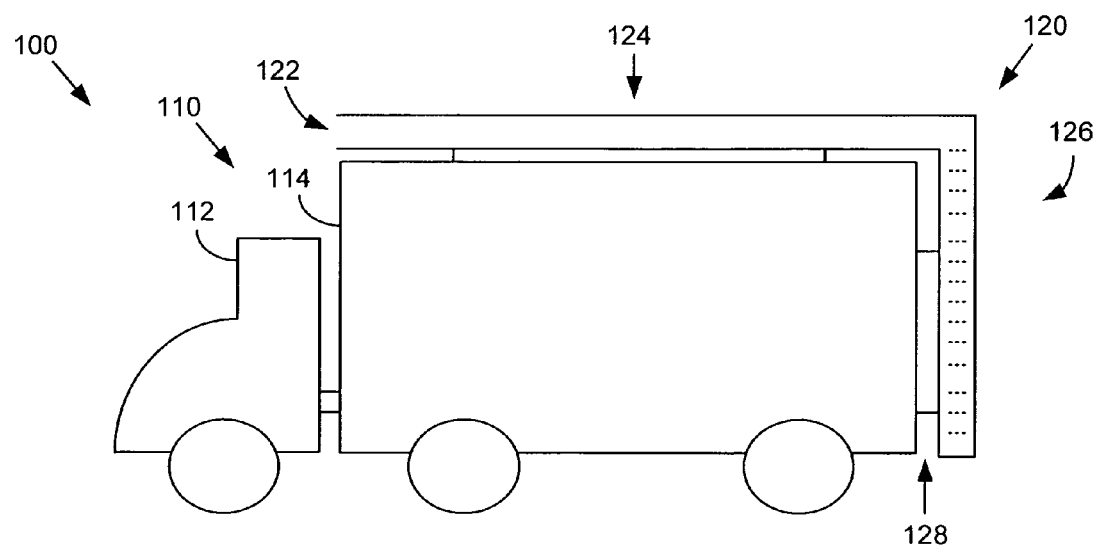
FIG. 8 illustrates another exemplary embodiment of an aerodynamic drag system.

FIG. 8 illustrates an embodiment where the air distribution system 126 may not have a curved face. Instead, the face may be flat, such that the aerodynamic drag system protrudes from the door equally from the top to the bottom. This allows the doors to swing open for the entire 270 degrees or very close to the entire 270 degrees without hitting the side of the trailer and interfering with loading docks (e.g., trailers parked adjacent to the trailer).

Returning to FIG. 1, the air distribution system 126 may include one or more distribution openings 128. A distribution opening may be a hole, slot, vent, or other outlet that allow air to escape the air distribution system 126. The air distribution system 126 may include all the same type of distribution openings (e.g., all slots) or a combination thereof (e.g., a combination of holes and slots).

Figure 9:
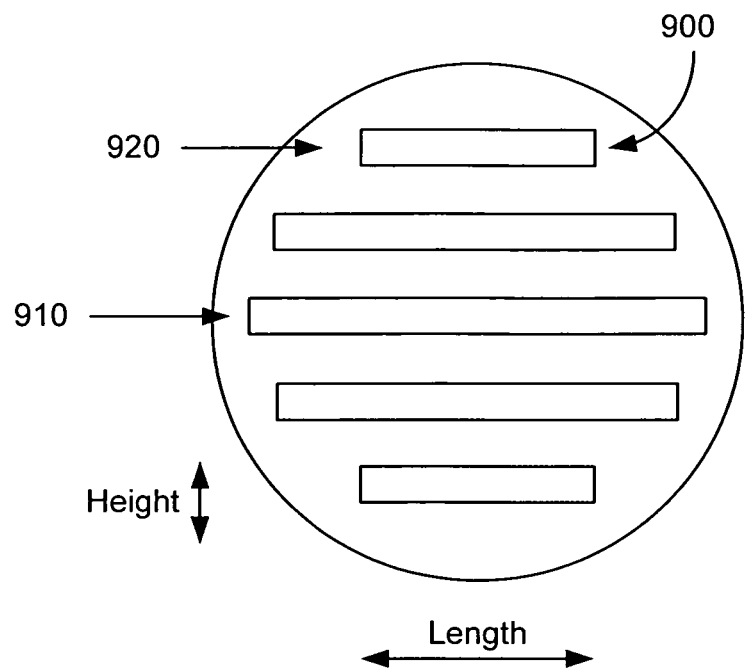
FIG. 9 illustrates an exemplary embodiment of distribution openings.
Figure 10:
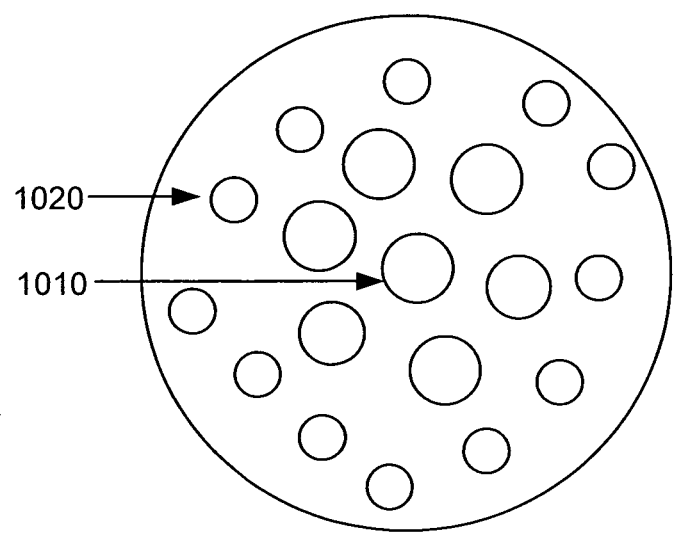
FIG. 10 illustrates an exemplary embodiment of distribution openings.
Figure 11:
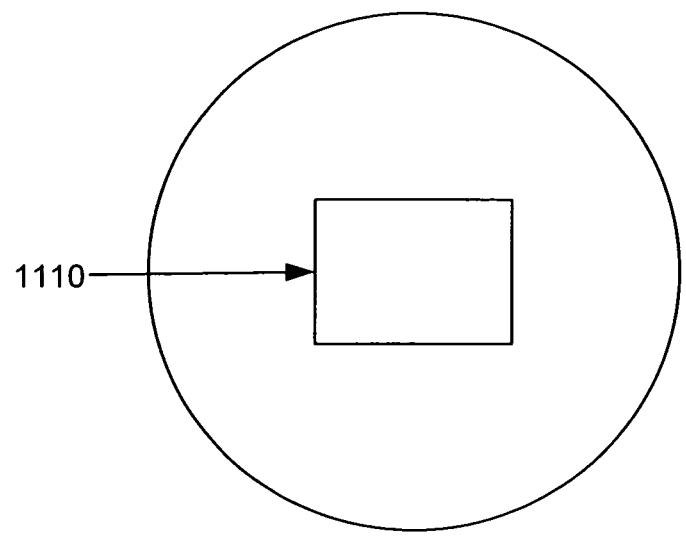
FIG. 11 illustrates an exemplary embodiment of distribution openings.
Figure 12:
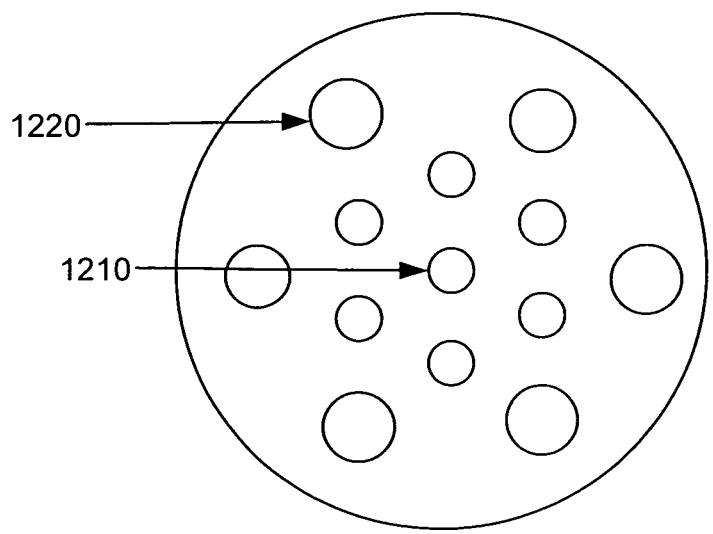
FIG. 12 illustrates an exemplary embodiment of distribution openings.

The distribution openings 128 may be strategically sized and/or located in a configuration that reduces or minimizes drag at the rear of the trailer (e.g., reduces or minimizes the vacuum at the rear of the trailer). For example, as shown in FIG. 9, the distribution openings 900 at the center 910 of the air distribution system may be longer (e.g., 3 feet long "Length"/1 inch tall "Height") than the opening(s) 920 further away from center (e.g., 2 feet long/1 inch tall and 1 foot long/1 inch tall). While arranged horizontally in FIG. 9, the openings 900 may be rotated (e.g., and arranged vertically). In another example, as shown in FIG. 10, there may be larger distribution openings (e.g., radius of 1 inch) in the middle 1010 of the air distribution system 126 and smaller (e.g., radius of ½ inch) near the perimeter 1020 of the air distribution system 126. In this example, larger and smaller are relative to the opening at different areas of the air distribution system 126. In yet another example, as shown in FIG. 11, there may only be a single distribution opening 1100. In yet another example, as shown in FIG. 12, the openings at the perimeter 1220 of the air distribution system may be larger than those closer to the center 1210.

Figure 13:
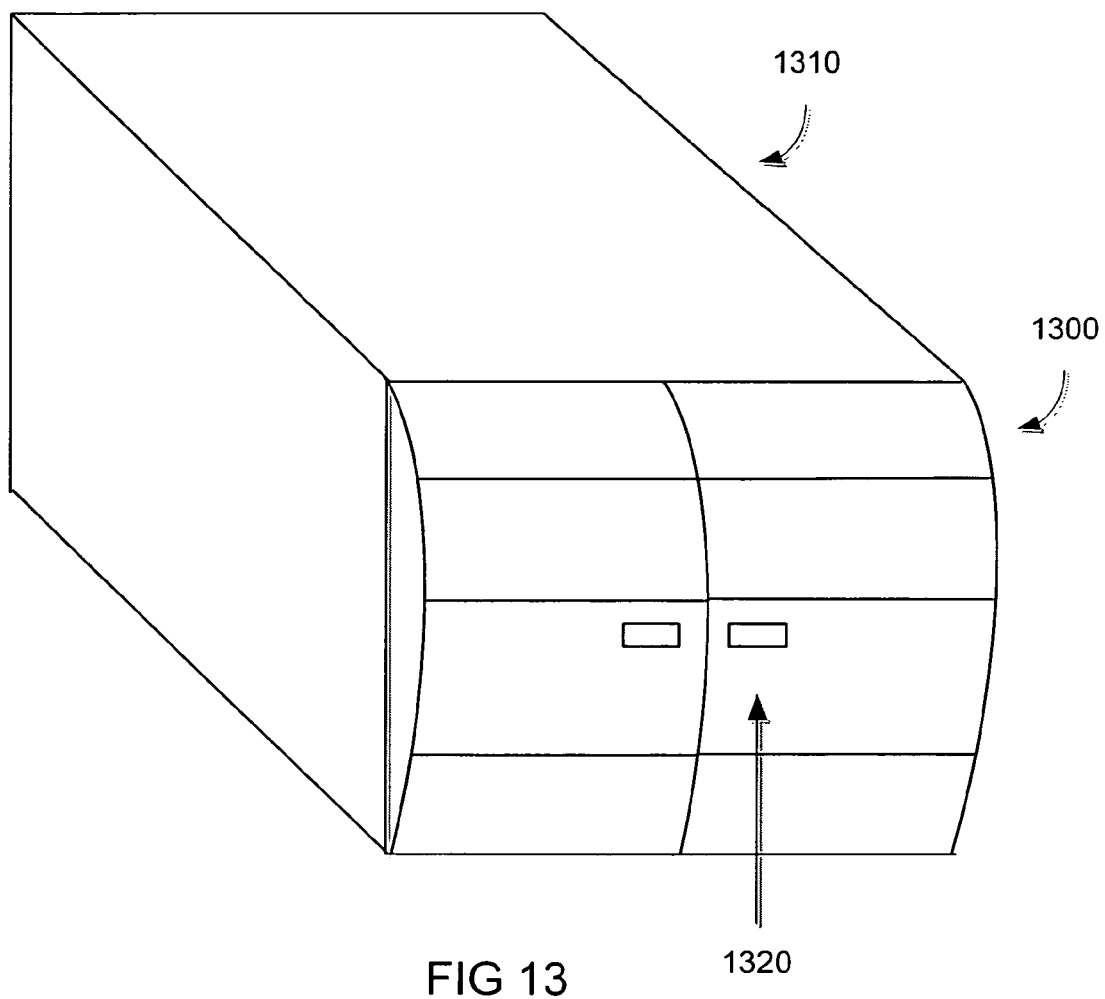
FIG. 13 illustrates another exemplary embodiment of an aerodynamic drag system.
Figure 14:
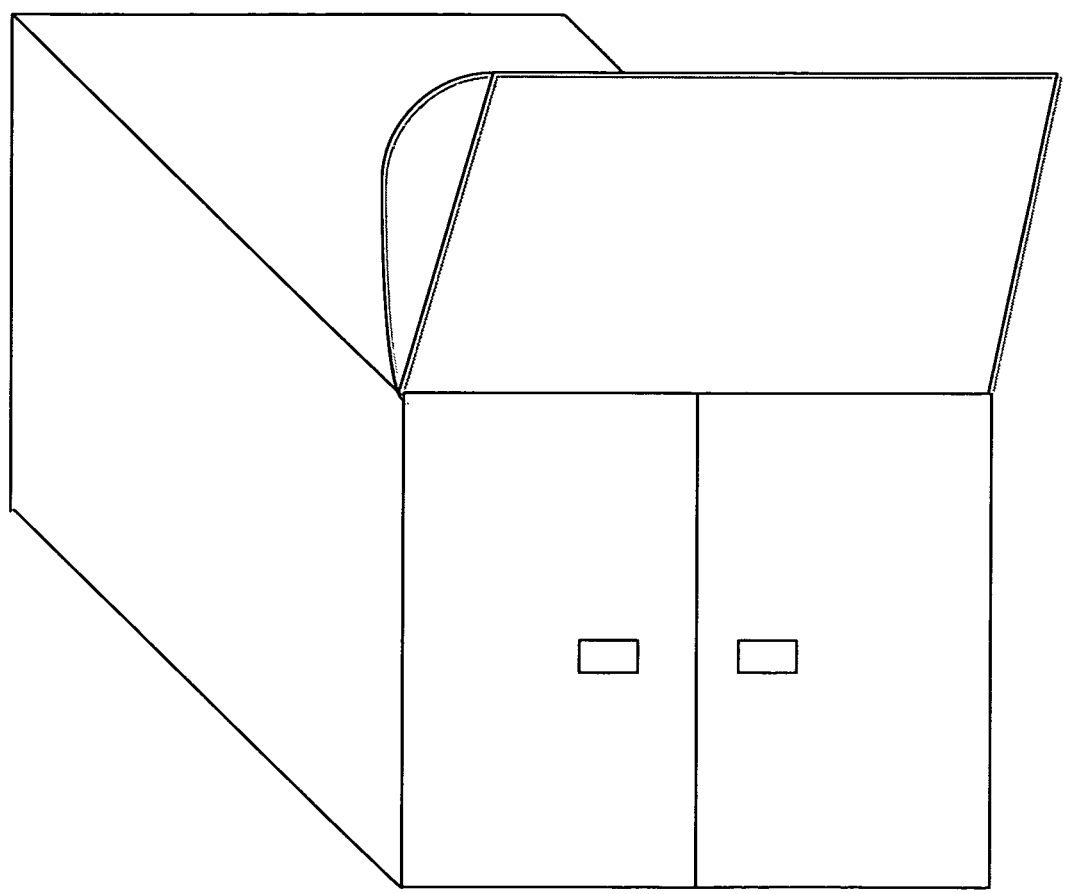
FIG. 14 illustrates another exemplary embodiment of an aerodynamic drag system.

FIG. 13 illustrates an embodiment that allows the doors to swing open. In this embodiment, the aerodynamic drag system 1300 includes two pieces that are hinged on the outside, such that the aerodynamic drag system can swing open like doors and allow access to the contents of the trailer 1310. The aerodynamic drag system 1300 may include handles 1320 that open a latch system that keeps the aerodynamic drag system closed when transporting cargo. In some embodiments, as shown in FIG. 14, the hinges may be on top and allow the aerodynamic drag system to swing open toward the top. The aerodynamic drag system may include a hydraulic system that helps with the opening and shutting.

Figure 15:
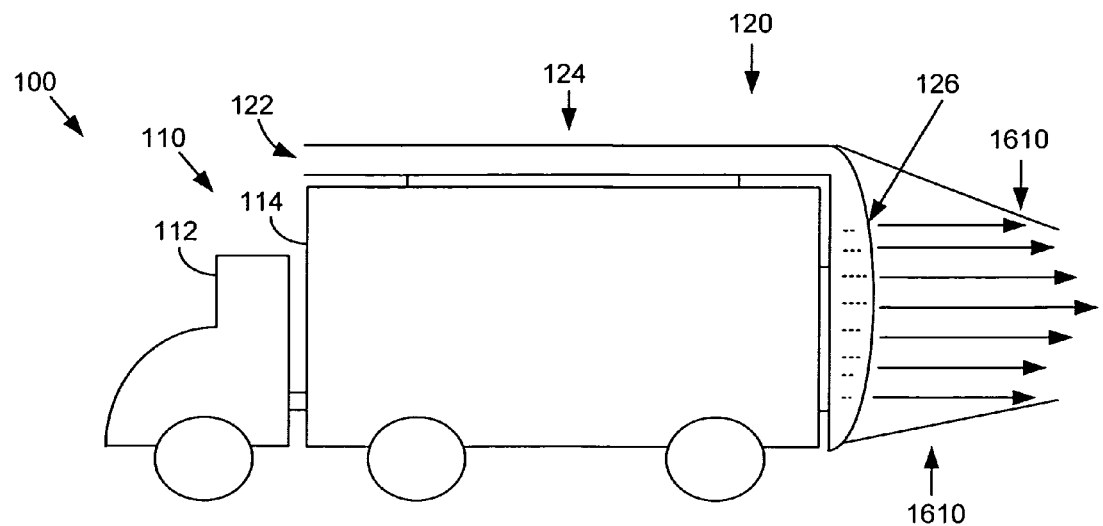
FIG. 15 illustrates another exemplary embodiment of an aerodynamic drag system.
Figure 16:
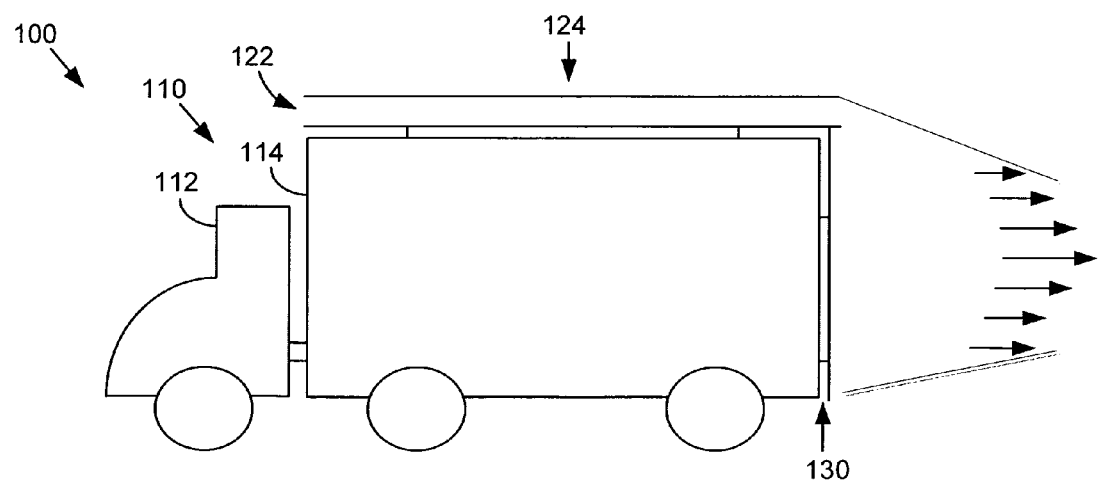
FIG. 16 illustrates another exemplary embodiment of an aerodynamic drag system.

FIGS. 15 and 16 illustrate embodiments where the aerodynamic drag system according to an embodiment is used in conjunction with a trailer tail. Trailer tails are used to reduce the vacuum located at the rear of the trailer by streamlining or reducing the edge over the back of the trailer. One example of a trailer tail is the TrailerTail® technology sold by ATDynamics, Inc. (headquartered in Hayward, Calif.) and described in U.S. Pat. Nos. 8,100,461; 8,360,509; 8,360,510; 8,708,399; 8,272,680; 7,850,224; and 8,480,162, which this document incorporates each by reference for purposes of describing trailer tail technology.

As shown in FIG. 15, the trailer 114 may include both a trailer tail 1610 and an aerodynamic drag system 120 according to an embodiment. The air capture system 122 captures air at the front of the cargo truck and the air channel system guides the captured air to the rear of the trailer and into the air distribution system 126. The air distribution system 126 distributes the air into the trailer tail 1610 and out into the atmosphere. The air coming out of the trailer tail 1610 further streamlines the air flow over the trailer (e.g., and in this example over the air channel system and trailer tail) because it pushes air out of the trailer tail 1610 and reduces the vacuum that is created from air coming over the trailer tail 1610.

FIG. 16 illustrates an embodiment where the trailer 114 may include both a trailer tail 1610 and an aerodynamic drag system 120 according to an embodiment. In this example, the aerodynamic drag system 120 does not include an air distribution system. Instead, the air channel system 124 guides the air into the trailer tail 1610 and out into the atmosphere.

Aerodynamic Drag System Reduces Air Drag and Vacuum

Figure 17:
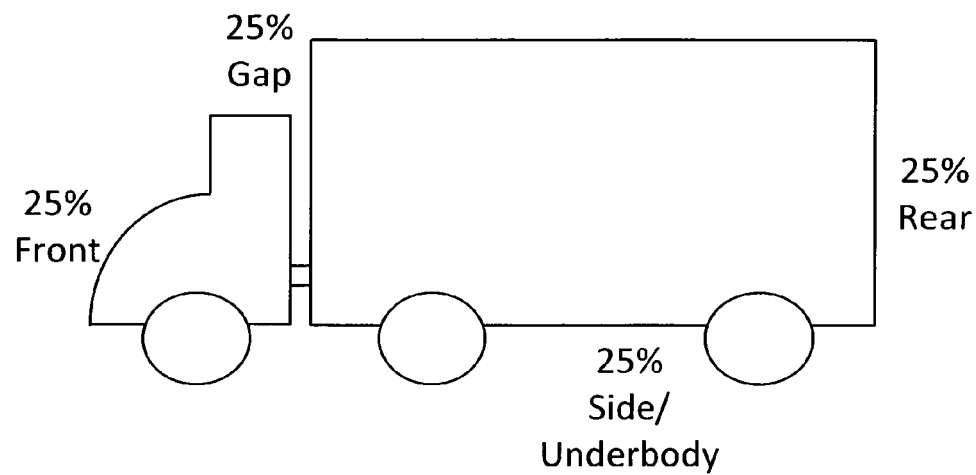
FIG. 17 illustrates the four main areas of a cargo truck that create drag.

FIG. 17 illustrates the four major areas of aerodynamic drag on a tractor-trailer. Aerodynamic drag is a function of squared velocity. At highway speeds, it accounts for approximately 65% of the fuel consumed by a tractor-trailer. As shown in FIG. 17, the four major areas of aerodynamic drag on a tractor-trailer are: front of the cab, gap between the cab and the trailer, side/underbody of the trailer, and the rear of the trailer. The most fuel efficient and successful trucking fleets utilize aerodynamic trucks, minimize the gap between the truck and trailer, install skirts to prevent air from hitting their rear axles of the trailer and install trailer tails (e.g., TrailerTail® technology sold by ATDynamics, Inc.), an aerodynamic drag system described herein, or a combination thereof to streamline airflow at the rear of the vehicle. The aerodynamic drag system described herein may be configured to reduce drag at the gap, side/underbody, and/or rear of the cargo truck. For example, adding an aerodynamic drag system to the cargo truck shown in FIG. 17 may reduce the drag and thus improve fuel efficiency.

Figure 18:
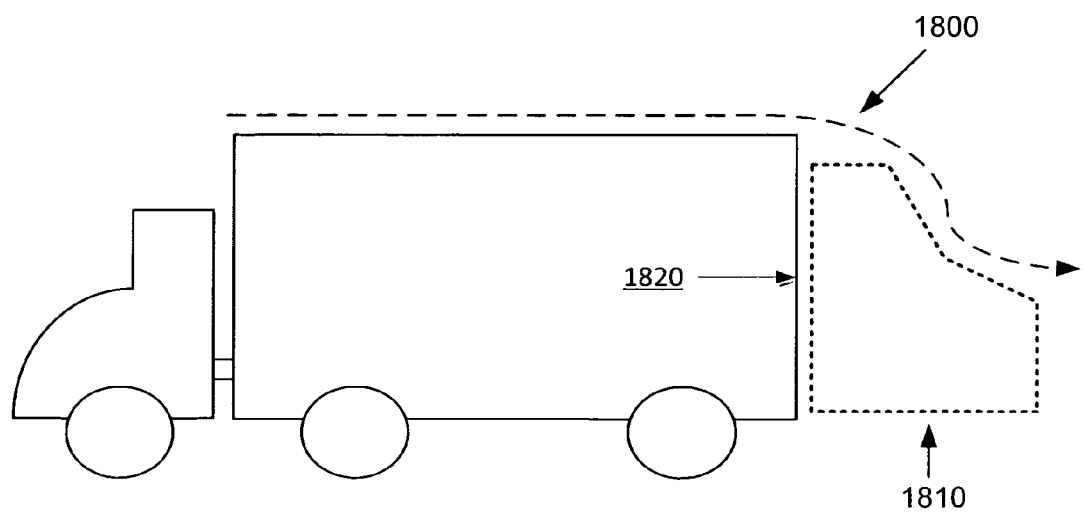
FIG. 18 illustrates the creation of a vacuum at the rear of a cargo truck.

FIG. 18 shows the creation of a vacuum 1810. As air 1800 flows over the top of the trailer and across the back, around the side, and under the trailer, a vacuum is created between the rear of the trailer 1820 and the flow of air 1800 when the truck is moving forward. The flow of air 1800 essentially pulls on the rear of the trailer 1820 thus creating a vacuum 1810. The flow of air 1800 and vacuum 1810 illustrates how the aerodynamic drag system would reduce this pull or vacuum. Air distributed through the air distribution system would push against the air flow 1800 and reduce the pull or vacuum. The distribution openings would be configured in a way to minimize this pull or vacuum. For example, larger openings may be located at the top (e.g., nearest the air flow 1800) such that the force pushing on the air flow 1800 would be greatest nearest the air flow 1800.

An aerodynamic drag system described herein may be configured to reduce the differential pressure of the cargo truck. The aerodynamic drag system may be configured to reduce the pull or vacuum 1810 created at the rear of the trailer by the air flow 1800 over the trailer.

For example, atmospheric pressure is normally 14.7 psi. When the cargo truck is stopped (e.g., resting, not moving), it has 14.7 psi pushing on it in all directions; therefore the differential pressure is zero. The same force forward as the force backward. However, when the truck is traveling at 60 mph, for example, the pressure on the front of the truck increases from 14.7 to 14.9 psi and the pressure on the back of the truck drops from 14.7 to 14.6 psi because of the vacuum 1810 created by the pull of the air flow 1800 flowing over the rear 1820 of the trailer when the cargo truck is moving forward. The pressure on the front (any area facing forward) increases by 0.2 psi and the back (rearward facing) decreases by 0.1 psi. The differential is then 0.3 psi (e.g., 14.9-14.6 psi). An aerodynamic drag system as described herein may be used to decrease the pressure on the front of the cargo truck (e.g., cab) and/or increase the pressure on the rear of the trailer. The reason for the drop on the forward facing area is that the aero dynamic drag system allows the air to flow through the scoop into the air channel by reducing the area of the front wall. The reason for the increase in absolute pressure in the back is the air from the air channel is being forced down into the air distribution net, thus increasing the pressure on the back of the trailer.

If the drag of 0.3 psi differential can be reduced by 10%, then drag would be: 0.27 psi (e.g., 0.3 psi*10%=0.03 psi and 0.3 psi–0.03 psi=0.27 psi). Using 0.27 psi as the new assumed drag, the drag resistance would be approximately 4088 lb (e.g., 9216 in (squared)*0.27 lb/inches(squared) =2488 lb. The rolling resistance would be 80,000# (gross vehicle weight)*0.02 (rolling resistance coefficient)=1600#. Thus, the total resistance=1600 lb+2488 lb=4088 lb. The total savings would 6.3% (e.g., Total Resistance (2)/Total Resistance (1)=4088/4362=93.7% which is a 6.3% savings).

In terms of gasoline consumed each year, a normal truck mileage for a truck is (5) miles per gallon (mpg). Assuming a truck travels 500 miles/day @ 250 days per year=125000 miles/year. Assume 100,000 miles/year*1 gal/5 miles=20,000 gals/year and $3/gallon, total consumption would be $60,000/year. At 6.3% savings, this would be a savings of $3,780 fuel savings per year ($60,000*6.3%=$3,780).

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

The invention claimed is:

1. A system for reducing air drag on a cargo truck, comprising:
    a tractor tail coupled with a rear face of the cargo truck,
        wherein the rear face is located at a rear end of the cargo truck,
        wherein the tractor tail comprises foldable doors that overlie the rear face when folded in and create a tapered tail that extends from the rear face of the cargo truck and is configured with an angle of taper relative to a top and bottom of the cargo truck,
        wherein the tail chamber includes an inside tail chamber that allows air to flow from a front end of the tractor tail to a rear end of the tractor tail, and
        wherein the tractor tail, when extended, creates a vacuum during operation from air flowing over the tractor tail;
    an air capture system configured to capture air at a front location of a cargo truck;
    an air channel system coupled with the air capture system and configured to guide the captured air from the front location of a cargo truck to a rear location of the cargo truck; and
    an air distribution system coupled with the air channel system and configured to receive air from the front location of the cargo truck and distribute the captured air into the inside tail chamber at the front end of the tractor tail such that the captured air is pushed out of the back end of the inside tail chamber and reduces the vacuum that is created from air flowing over the trailer tail.

2. The aerodynamic draft system of claim 1, wherein the angle of taper is relative to the top and bottom of the cargo truck and is between approximately seven degrees and twenty degrees.

* * * * *